United States Patent [19]

Ziegler et al.

[11] Patent Number: 4,493,033

[45] Date of Patent: Jan. 8, 1985

[54] DUAL PORT CACHE WITH INTERLEAVED READ ACCESSES DURING ALTERNATE HALF-CYCLES AND SIMULTANEOUS WRITING

[75] Inventors: Michael L. Ziegler, Whitinsville; Michael B. Druke, Chelmsford, both of Mass.

[73] Assignee: Data General Corporation, Westboro, Mass.

[21] Appl. No.: 447,105

[22] Filed: Dec. 6, 1982

Related U.S. Application Data

[63] Continuation of Ser. No. 143,974, Apr. 25, 1980, abandoned.

[51] Int. Cl.³ .................. G06F 9/00; G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,169,284 | 9/1979 | Hogan et al. | 364/200 |
| 4,317,168 | 2/1982 | Messina et al. | 364/200 |
| 4,345,309 | 8/1982 | Arulpragasm et al. | 364/200 |
| 4,371,929 | 2/1983 | Braun et al. | 364/200 |
| 4,426,681 | 1/1984 | Bacot | 364/200 |

*Primary Examiner*—Raulfe B. Zache
*Assistant Examiner*—A. E. Williams, Jr.
*Attorney, Agent, or Firm*—Robert F. O'Connell

[57] ABSTRACT

A data processing system handles thirty-two bit logical addresses which can be derived from either sixteen bit logical addresses or thirty-two bit logical addresses, the latter being translated into physical addresses by unique translation means. The system includes means for decoding macro-instructions of both a basic and an extended instruction set, each macro-instruction containing in itself selected bit patterns which uniquely identify which type of instruction is to be decoded. The decoded macro-instructions provide the starting address of one or more micro-instructions, which address is supplied to a unique micro-instruction sequencing unit which appropriately decodes a selected field of each micro-instruction to obtain each successive micro-instruction. The system uses hierarchical memory storage using eight storage segments (rings), access to the rings being controlled in a privileged manner according to different levels of privilege. The memory system uses a bank of main memory modules which interface with the central processor system via a dual port cache memory, block data transfers between the main memory and the cache memory being controlled by a bank controller unit.

7 Claims, 1 Drawing Figure

DUAL PORT CACHE WITH INTERLEAVED READ ACCESSES DURING ALTERNATE HALF-CYCLES AND SIMULTANEOUS WRITING

This is a continuation of application Ser. No. 143,974 filed Apr. 25, 1980, now abandoned.

INTRODUCTION

This invention relates generally to data processing systems and, more particularly, to such systems which can handle 32 bit logical addresses at a size and cost which is not significantly greater than that of systems which presently handle only 16 bit logical addresses.

RELATED APPLICATIONS

This application is one of the following groups of applications, all of which include the same text and drawings which describe an overall data processing system and each of which includes claims directed to a selected aspect of the overall data processing system, as indicated generally by the titles thereof as set forth below. All of such applications are being filed concurrently and, hence, all have the same filing date of Apr. 25, 1980.

(1) Data Processing System, Ser. No. 143,561, filed by E. Rasala, S. Wallach, C. Alsing, K. Holberger, C. Holland, T. West, J. Guyer, R. Coyle, M. Ziegler and M. Druke, now U.S. Pat. No. 4,386,399, issued May 31, 1983;

(2) Data Processing System Having A Unique Address Translation Unit, Ser. No. 143,681, filed by S. Wallach, K. Holberger, S. Staudener and C. Henry, now abandoned and refiled as U.S. patent application, Ser. No. 451,899, filed Dec. 21, 1982;

(3) Data Processing System Utilizing A Hierarchical Memory Storage System, Ser. No. 143,981, filed by S. Wallach, K. Holberger, D. Keating and S. Staudaher, now U.S. Pat. No. 4,409,655, issued July 29, 1983;

(4) Data Processing System Having A Unique Memory System, Ser. No. 143,974, filed by M. Ziegler and M. Druke, now abandoned and refiled as U.S. patent application, Ser. No. 447,105, filed Dec. 6, 1982;

(5) Data Processing System Having A Unique Instruction Processor System, Ser. No. 143,651, filed by K. Holberger, J. Veres, M. Ziegler and C. Henry, now U.S. Pat. No. 4,398,243, issued Aug. 9, 1983;

(6) Data Processing System Having A Unique Microsequencing System, Ser. No. 143,710, filed by C. Holland, K. Holberger, D. Epstein, P. Reilly and J. Rosen, now abandoned and refiled as U.S. patent application, Ser. No. 473,560, filed Mar. 9, 1983;

(7) Data Processing System Having Unique Instruction Responsive Means, Ser. No. 143,982, filed by C. Holland, S. Wallach and C. Alsing, now U.S. Pat. No. 4,434,459, issued Feb. 24, 1984.

BACKGROUND OF THE INVENTION

Presently available data processing systems which are often referred to as belonging to the "mini-computer" class normally handle logical addresses and data words which are 16 bits in length. As used herein, the term "logical" address, sometimes referred to by those in the art as a "virtual" address, is used to denote an address that is programmer visible, an address which the programmer can manipulate. In contrast, a "physical" address is the address of a datum location in the main memory of a data processing system. Operating data processing systems utilize appropriate translation tables for converting logical addresses to physical addresses.

Such systems require appropriate handling of accesses to the main memory and require access both by internal system components and external (I/O) components.

Accordingly, it is desired that such data processing systems have means for controlling the access and for providing the most effective and efficient techniques for accessing not only specific data words but also blocks of data words.

BRIEF SUMMARY OF THE INVENTION

The system of the invention utilizes a unique combination of central processor and memory units, the processor comprising an address translation unit, an instruction processor unit, an arithmetic logic unit and a microsequencing unit, while the memory unit includes a system cache unit, a main memory unit and a bank controller unit for controlling data transfers therebetween. The system handles thirty-two bit logical addresses which can be derived from either sixteen bit or thirty-two bit addresses. Unique means are provided for translating the thirty-two bit logical addresses.

The invention of this particular application involves a memory system which uses a main memory comprising a plurality of memory modules each having a plurality of memory planes. The main memory normally interfaces with the remainder of the system via a dual port system cache memory unit, block data transfers between the main memory and the system cache are controlled by a bank controller unit. The system cache is arranged so that access can be provided thereto by the CPU or by I/O devices on separate phases of the operating time cycle, access requests thereby being capable of being pipe-lined. In addition, blocks of information in the main memory can be transferred to the cache using both phases of the time cycle. Moreover, memory data can be made immediately available via a by-pass path from the main memory without passing through the cache. Further, parts of two different consecutive words in the cache which must be assembled into correct order can be read directly therefrom and placed into the correct order by appropriate rotation techniques.

BRIEF DESCRIPTION OF THE DRAWINGS

The invention can be described in more detail with the help of the drawings wherein.

Figure 1:
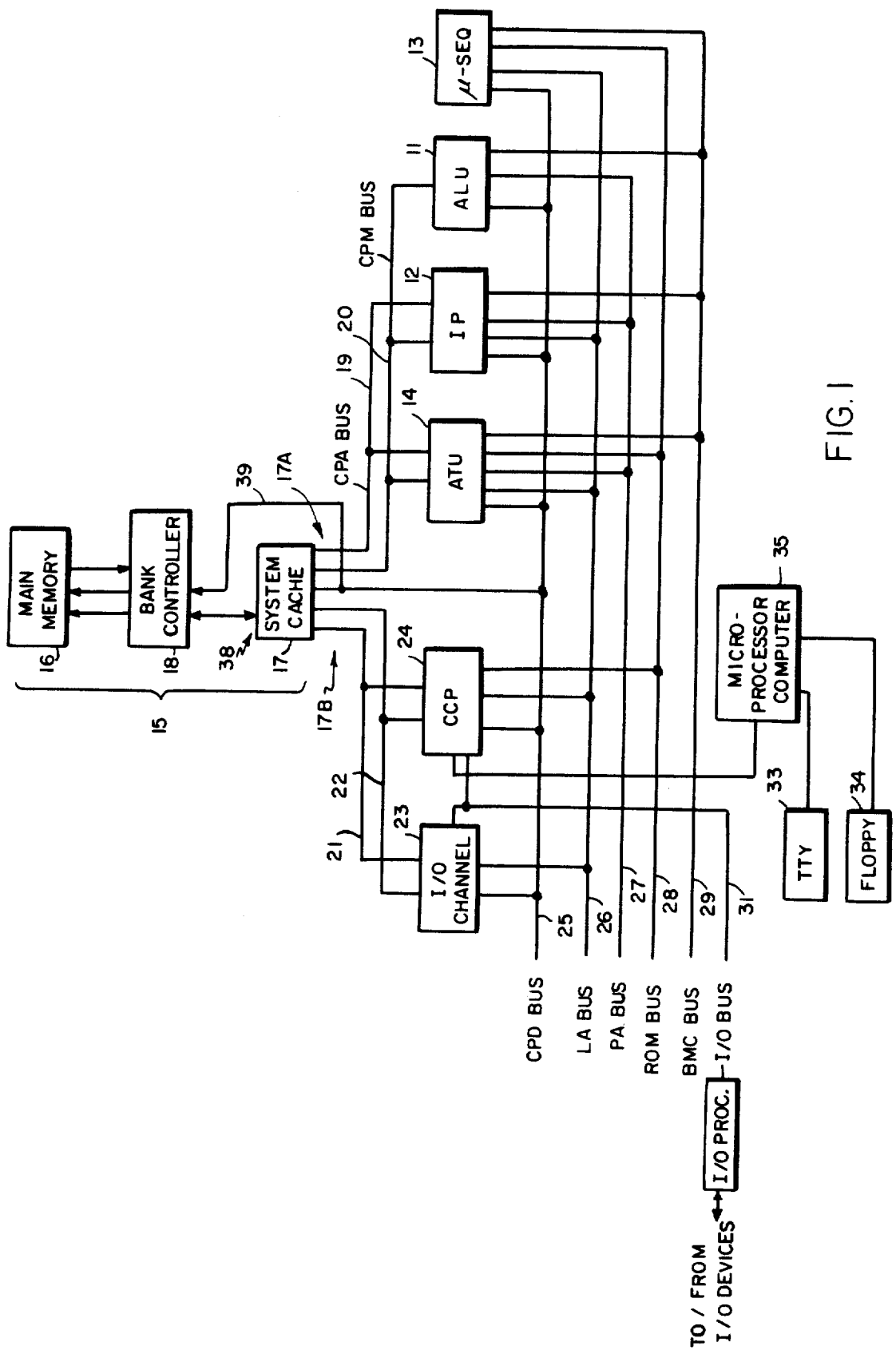
FIG. 1 shows a block diagram of the overall data processing system of the invention as described therein.

This application incorporates by reference the entire application, Ser. No. 143,982, filed on Apr. 25, 1980, of Charles J. Holland et al., now issued as U.S. Pat. No. 4,434,459, dated Feb. 24, 1984.

What is claimed is:

1. A data processing system having a memory system, said memory system comprising
    a main memory storage means for storing a first plurality of blocks of data words;
    an intermediate cache storage system including
    data store means for storing a second plurality of blocks of data words corresponding to a predetermined number of said first plurality of blocks of data words stored in said main memory storage means;

first address and data ports providing access to said intermediate cache storage system by first selected data request sources; and second address and data ports providing access to said intermediate cache storage system by second selected data request sources;

timing control means for enabling said first address and data ports for providing access to said intermediate cache storage system only by said first selected data request sources during a first portion of any data processing operating time cycle and for enabling said second address and data ports for providing access to said intermediate cache storage system only by said second selected data request sources during a second portion of any data processor operating time cycle; and further control means connected between said main memory storage means and said intermediate cache storage system for controlling the sequential transfer of blocks of data words from said main memory storage system to said intermediate cache storage system, so that data words can be written into the data store means of said intermediate cache storage system during both said first and second portions of said data processing operating time cycle.

2. A data processing system in accordance with claim 1 wherein said intermediate cache storage system further includes means connected to said first and second address ports for accepting an address from a data request source which address includes a first plurality of tag bits, a second plurality of index bits, and a third plurality of word pointer bits; and further including tag store means for storing a block of tag bit combinations each combination corresponding to one of the second plurality of blocks of data words stored in said intermediate cache storage system; and tag bit comparison means connected to said address accepting means and to said tag store means, said tag bit comparison means being responsive to the tag bits of an incoming address signal which is supplied to said intermediate cache storage system and to the tag bit combinations stored in said tag store means for comparing the tag bits of said incoming address to the tag bit combinations stored in said tag store means and for supplying a tag comparison signal which indicates a cache fault condition if the tag bits of said incoming address do not correspond to any of the tag bit combinations stored in said tag store means and which indicates a cache operate condition if the tag bits of said incoming address do so correspond.

3. A system in accordance with claim 2 and further including index identifying means connected to said address accepting means and responsive to the index bits of said incoming address for identifying a selected one of said second plurality of blocks of data words stored in said intermediate cache storage system.

4. A system in accordance with claim 3 and further including word identifying means connected to said address accepting means and responsive to the word pointer bits of said incoming address for identifying the location of a selected one of the data words in said selected one of said second plurality of blocks of data words stored in said intermediate cache storage system; and said data store means connected to said index identifying means and said word identifying means and responsive to said tag comparison signal for accessing the selected one of the data words stored in said data store means when said tag comparison signal indicates a cache operate condition.

5. A system in accordance with claim 4 and further including timing means for causing said tag identifying means, said index identifying means, said word identifying means, and said data store means to operate so that the identification of a data word in said data store means occurs at the same time the preceding data word is being accessed.

6. A system in accordance with claim 1 wherein said intermediate cache storage system further includes a by-pass data transmission path means for transferring a block of data words directly to said main memory storage means from a data source without storing said directly transferred block of data words in the data store means of said intermediate cache storage system.

7. A data processing system in accordance with claim 1 wherein said further control means includes means for transferring blocks of data words in sequence from said main memory storage means to the data store means of said intermediate cache storage system;

means for detecting all single-bit errors in the data words of a block thereof which is being so transferred prior to the correction of any of said detected single-bit errors; and means for correcting all single-bit errors in the data words of said block thereof which is being so transferred prior to detecting single-bit errors in a subsequent block of data words which is to be subsequently transferred.

* * * * *